(12) United States Patent
Zhang

(10) Patent No.: US 10,824,139 B2
(45) Date of Patent: Nov. 3, 2020

(54) EQUIPMENT MAINTENANCE METHOD, EQUIPMENT MAINTENANCE DEVICE, AND STORAGE MEDIUM FOR THE SAME

(71) Applicant: Shenzhen Jingjiang Yunchuang Technology Co., Ltd., Shenzhen (CN)

(72) Inventor: Xue-Qin Zhang, Shenzhen (CN)

(73) Assignee: Shenzhen Jingjiang Yunchuang Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/444,905

(22) Filed: Jun. 18, 2019

(65) Prior Publication Data
US 2020/0201311 A1     Jun. 25, 2020

(30) Foreign Application Priority Data
Dec. 19, 2018  (CN) .......................... 2018 1 1559887

(51) Int. Cl.
*G08B 21/00* (2006.01)
*G05B 23/02* (2006.01)
*G05B 19/418* (2006.01)

(52) U.S. Cl.
CPC ..... *G05B 23/0272* (2013.01); *G05B 19/4184* (2013.01); *G05B 23/0264* (2013.01); *G05B 23/0283* (2013.01); *G05B 2219/24001* (2013.01); *G05B 2219/32234* (2013.01)

(58) Field of Classification Search
CPC ............ G05B 23/0272; G05B 19/4184; G05B 23/0264; G05B 23/0283; G05B 2219/24001; G05B 2219/32234

USPC .......................................................... 340/679
See application file for complete search history.

(56) References Cited

U.S. PATENT DOCUMENTS

| | | | |
|---|---|---|---|
| 7,254,514 B2* | 8/2007 | House ................ | G05B 23/0248 318/565 |
| 7,634,384 B2* | 12/2009 | Eryurek ................ | G05B 15/02 702/182 |
| 10,310,496 B2* | 6/2019 | Piety .................. | G05B 23/0283 |
| 2002/0038200 A1* | 3/2002 | Shimizu ............. | G05B 23/0256 702/188 |
| 2004/0186927 A1* | 9/2004 | Eryurek ............. | G05B 23/0283 710/12 |
| 2004/0249606 A1* | 12/2004 | Hoppes ............ | G05B 19/41805 702/183 |

(Continued)

FOREIGN PATENT DOCUMENTS

| | | |
|---|---|---|
| TW | 201037473 | 10/2010 |
| TW | 201219756 | 5/2012 |

*Primary Examiner* — Kerri L McNally
*Assistant Examiner* — Thang D Tran
(74) *Attorney, Agent, or Firm* — ScienBiziP, P.C.

(57) ABSTRACT

A method for maintaining industrial equipment through analyzing data from multiple sources associated with the industrial equipment is based on a predetermined list of fault categories. The method includes acquiring the data associated with the industrial equipment, analyzing the data according to the predetermined list of fault categories, and outputting a fault report of the industrial equipment according to the analysis. Information as to fault processing of the industrial equipment is updated to the predetermined list, the fault processing information being adopted according to the fault report. An equipment maintenance device and a storage medium are also provided.

13 Claims, 3 Drawing Sheets

(56) References Cited

U.S. PATENT DOCUMENTS

| | | | |
|---|---|---|---|
| 2005/0197727 A1* | 9/2005 | Ogushi | G03F 7/70525 700/108 |
| 2005/0240376 A1* | 10/2005 | Uwatoko | G03G 15/55 702/183 |
| 2005/0262394 A1* | 11/2005 | Yasukawa | G06F 11/0733 714/23 |
| 2009/0077055 A1* | 3/2009 | Dillon | G06F 16/337 |
| 2012/0092180 A1* | 4/2012 | Rikkola | G06F 21/554 340/679 |
| 2012/0232756 A1* | 9/2012 | Yuan | F15B 19/002 701/41 |
| 2013/0218522 A1* | 8/2013 | Suzuki | G05B 23/0208 702/183 |
| 2014/0195184 A1* | 7/2014 | Maeda | G05B 21/02 702/85 |
| 2014/0212978 A1* | 7/2014 | Sharpe, Jr. | G01N 17/00 436/6 |
| 2015/0160098 A1* | 6/2015 | Noda | G05B 23/024 702/35 |
| 2016/0292262 A1* | 10/2016 | Matsumoto | H04W 12/08 |
| 2016/0378076 A1* | 12/2016 | Hill | G05B 13/026 700/28 |
| 2017/0102694 A1* | 4/2017 | Enver | G05B 19/4184 |
| 2018/0284744 A1* | 10/2018 | Cella | G05B 19/4185 |
| 2018/0341255 A1* | 11/2018 | Turney | G05B 23/0283 |
| 2018/0341688 A1* | 11/2018 | Ganesh | G06Q 10/063 |
| 2018/0373234 A1* | 12/2018 | Khalate | G06N 20/00 |
| 2019/0064787 A1* | 2/2019 | Maturana | G05B 23/0283 |
| 2019/0188584 A1* | 6/2019 | Rao | G05B 23/0221 |
| 2020/0192338 A1* | 6/2020 | Mangino | G05B 19/4184 |

* cited by examiner

EQUIPMENT MAINTENANCE METHOD, EQUIPMENT MAINTENANCE DEVICE, AND STORAGE MEDIUM FOR THE SAME

FIELD

The subject matter herein generally relates to maintenance of industrial equipments.

BACKGROUND

An unmanned factory, which may be administered as an Internet of Things, may include hundreds of thousands items of industrial equipment. Such equipment may break down or malfunction and fault complexity is also diverse. The workload regarding maintenance is very heavy.

Therefore there is a room for improvement.

BRIEF DESCRIPTION OF THE DRAWINGS

Implementations of the present technology will now be described, by way of example only, with reference to the attached figures.

DETAILED DESCRIPTION

Figure 1:
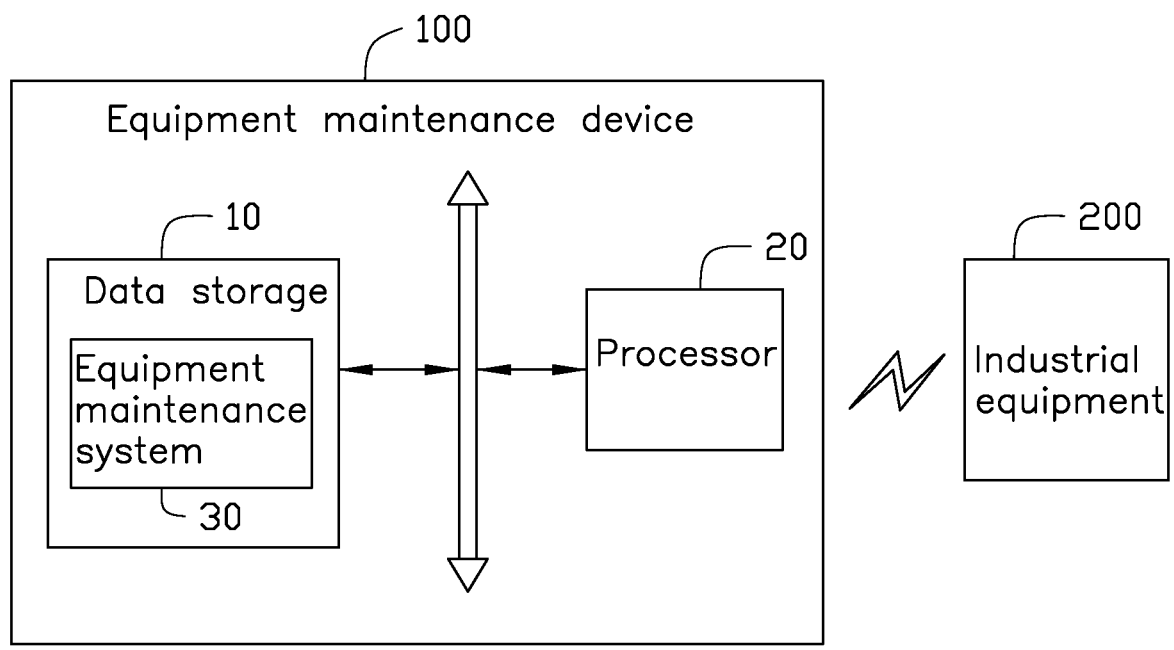
FIG. 1 is a block diagram of an embodiment of a device for maintaining equipment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates an equipment maintenance device 100 in accordance with an embodiment. The equipment maintenance device 100 can communicate in a wired or wireless manner with one or more industrial equipments 200.

In one embodiment, the equipment maintenance device 100 comprises at least one data storage 10, at least one processor 20, and an equipment maintenance system 30. The equipment maintenance system 30 is configured to function in relation to equipment maintenance.

In one embodiment, the equipment maintenance device 100 can be a computer, a notebook, or a server. The equipment maintenance device 100 can further comprise an input/output device, a network access device, and communication buses. The industrial equipments 200 can be workshop and factory equipment.

Figure 2:
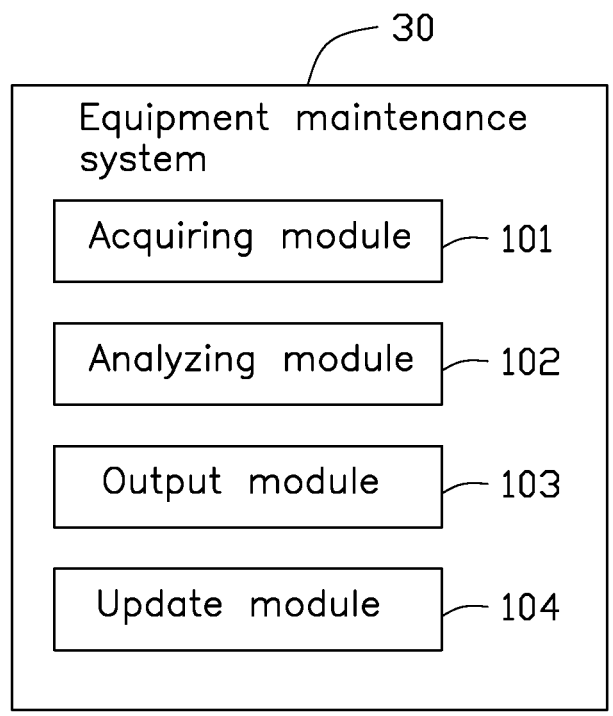
FIG. 2 is a block diagram of an embodiment of a system for maintenance applied by the device of FIG. 1.

FIG. 2 illustrates the equipment maintenance system 30 may comprise a plurality of modules, such as an acquiring module 101, an analyzing module 102, an output module 103, and an update module 104. The modules 101-104 may comprise one or more software programs in the form of computerized codes stored in the data storage 10. The computerized codes may include instructions that can be executed by the processor 20 to provide functions for the modules 101-104.

In one embodiment, the data storage 10 can be in the equipment maintenance device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the equipment maintenance device 100.

The acquiring module 101 can acquire data from multiple sources associated with the industrial equipment 200.

In one embodiment, the data from multiple sources ("multiple data") associated with the industrial equipment 200 can comprise data selected from the group consisting of equipment recording data, equipment parts recording data, equipment maintenance recording data, equipment operation, data from sensors, data from cameras, and product testing data. The equipment recording data can comprise model, specification, purchase date, service life, equipment name, serial number, user department, fault cause, fault process method, and replacement parts information of the industrial equipment 200. The equipment parts recording data can comprise information as to parts of the industrial equipment 200, for example, parts model, parts manufacturer, parts size, parts shape, parts material, parts function, parts production date, parts installation date, parts mounting position, parts function, parts control interface, and part control command.

The equipment maintenance recording data can comprise fault cause, fault process method, replacement parts model, replacement parts manufacturer, parts replacement time, and operator information of the industrial equipment 200. Data as to the equipment operation can comprise operation type, operation name, parts operation speed, parts operation acceleration, parts operation height, parts operation position, parts operation angle, parts operation direction of the industrial equipment 200. The data from sensors can comprise temperature, humidity, operating current, operating voltage, pressure, vibration, parts position, energy consumption, parts speed, and parts acceleration of the industrial equipment 200. The industrial equipment 200 can comprises multiple sensors, for example, pressure sensors, liquid level sensors, energy sensors, position sensors, acceleration sensors, radar sensors, radiation sensors, temperature sensors, vibration sensors, humidity sensors, magnetic sensors, gas sensors, vacuum sensors, and biological sensors. The data from cameras can comprise images of operations of the industrial equipment 200, for example, images of a tool when cutting, or of a rotating spindle. The data from cameras can be configured to analyze certain key parts. The product testing data can comprise data as to products or semi-finished products producing by the industrial equipment 200.

In one embodiment, the acquiring module 101 is further configured to store the multiple data associated with the industrial equipment 200 into a specified storage area. Then, the equipment maintenance device 100 can read data associated with the industrial equipment 200 from the specified storage area.

The analyzing module 102 is configured to analyze the multiple data associated with the industrial equipment 200 according to a predetermined list of categories of fault ("fault categories list").

In one embodiment, information as to one or more faults in the industrial equipment 200 can be recorded in categories when the industrial equipment 200 is in an operating state. Such list can be established according to one or more faults. For example, the one or more faults can comprise tool wear, tool breakage, spindle breakage, window shedding, and work arm deformation, etc. The categories in the list can comprise tool wear fault, tool breakage fault, spindle breakage fault, window shedding fault, and work arm deformation fault.

In one embodiment, when the analyzing module 102 analyzes the multiple data associated with the industrial equipment 200, the analyzing module 102 extracts data from the multiple data that is or can be associated with the fault categories list. The analyzing module 102 further monitors and analyzes the data for analysis of the multiple data. The analyzing module 102 can perform analysis of data according to each fault type of the fault categories of the fault categories list, which can save analysis time.

In one embodiment, the analyzing module 102 can further analyze the multiple data associated with the industrial equipment 200 through the following steps. First, the analyzing module 102 can extract specific data that conforms to a predetermined rule from the multiple data, and then determine the parts of the industrial equipment 200 or of one item of equipment corresponding to the specific data, and analyze the specific data according to characteristics of the parts of the equipment.

In one embodiment, the specific data can be distinguished and parsed into an abnormal but regular and stable operations, and sudden and unexpected operations that are abnormal. The analyzing module 102 can determine parts of the industrial equipment 200 corresponding to data for any abnormalities. The analyzing module 102 performs analysis on the data for abnormalities by combining current parameter information of the equipment parts.

The output module 103 can output a fault report of the industrial equipment 200 according to the analysis of the multiple data.

In one embodiment, the fault report can comprise fault level, fault severity information, fault type, probability of fault, fault occurrence time information, parts information related to the faults of the fault report, fault maintenance method or maintenance suggestion, and tools required for repairing the faults identified on the fault report. The fault report can be shown through text, images, and video.

In one embodiment, the output module 103 can send the fault report to Administrator through email or other means.

In one embodiment, the fault level can be calculated according to the formula $F=X*Y*Z$, where F represents fault level of a fault, X represents an impact rate of the fault to a production project, Y represents an impact rate of the fault to a product quality, and Z represents probability of the fault. An evaluation rule can be predetermined and established to obtain a value of X, and a range of the values of X can be between 1% and 100%. A predetermined evaluation rule can also be established to obtain a value of Y, and a range of the values of Y can be between 1% and 100%.

A value of Z can be calculated through the steps of the equipment maintenance device 100 pre-establishing a mapping table of the probability of fault and the fault occurrence time information, each fault occurrence time corresponding to a probability of fault in the mapping table. The equipment maintenance device 100 can then obtain current parameters as to equipment parts and calculate a fault occurrence time of the equipment parts according to the current parameters. The mapping table can be referred to for obtaining the probability of the fault of the equipment parts based on the fault occurrence time.

In one embodiment, the mapping table of the probability of fault and the fault occurrence time information is shown as the following table 1:

TABLE 1

| Fault Occurrence Time | Probability of Fault |
| --- | --- |
| 0~3 hours | 100% |
| 3~8 hours | 99% |
| 8~24 hours | 98% |
| 24~72 hours | 95% |
| 3~5 days | 90% |
| 5~10 days | 85% |
| 10~20 days | 80% |
| 20~30 days | 70% |
| . . . | . . . |

In one embodiment, a fault prediction model can be established based on parameters of the equipment parts of the industrial equipment 200 to predict fault occurrence time of the equipment parts. For example, the parameters of the equipment parts can be established and developed by a deep learning algorithm or a neural network model to establish the fault prediction model.

In one embodiment, the parameters of the equipment parts can comprise information such as a usage time of the equipment parts, a life expectancy of the equipment parts, a rate of aging of the equipment parts, wear information and impact information of the equipment parts in an operating state, changes in appearance of the equipment parts, control fault information of the equipment parts, and operating environment of the equipment parts.

In one embodiment, a fault indicator (not shown) and/or a fault warning indicator (not shown) can be set on the equipment maintenance device 100 or the industrial equipment 200. The fault indicator indicates current states of the plurality and of the individual items of industrial equipment 200. The fault indicator can comprise four indicating states, for example, red light, red flashing light, yellow light, and green light. The red light represents industrial equipment 200 in shutdown, the red flashing light represents a fault condition in the industrial equipment 200, the yellow light represents the industrial equipment 200 in standby mode, and the green light represents that the industrial equipment 200 is operating properly.

The fault warning indicator can be configured to predict faults that will or may occur in the future. The fault warning indicator can also comprise four indicating states, for example, red light, orange light, yellow light, and blue light. The red light represents that probability of fault occurrence is very high (for example, 90%~100%), and that loss caused by the fault may be very large. The orange light represents that probability of fault occurrence is relatively high (for example, 80%~90%), and that the loss caused by the fault may be relatively large. The yellow light represents that probability of fault occurrence is not high (for example, 55%~80%), and that loss caused by the fault may not be very large. The blue light represents low probability of fault occurrence (for example, less than 55%), and that loss caused by the fault may be slim.

The update module 104 is configured to obtain information as to fault processing of the industrial equipment 200 and update the fault categories list according to such information.

In one embodiment, when a fault is processed, the fault processing information can be recorded. Then, the update module 104 can obtain the fault processing information of the industrial equipment 200 and update the fault categories list according to the fault processing information.

In one embodiment, the fault processing information can be adopted according to the fault report of the industrial equipment 200.

Figure 3:
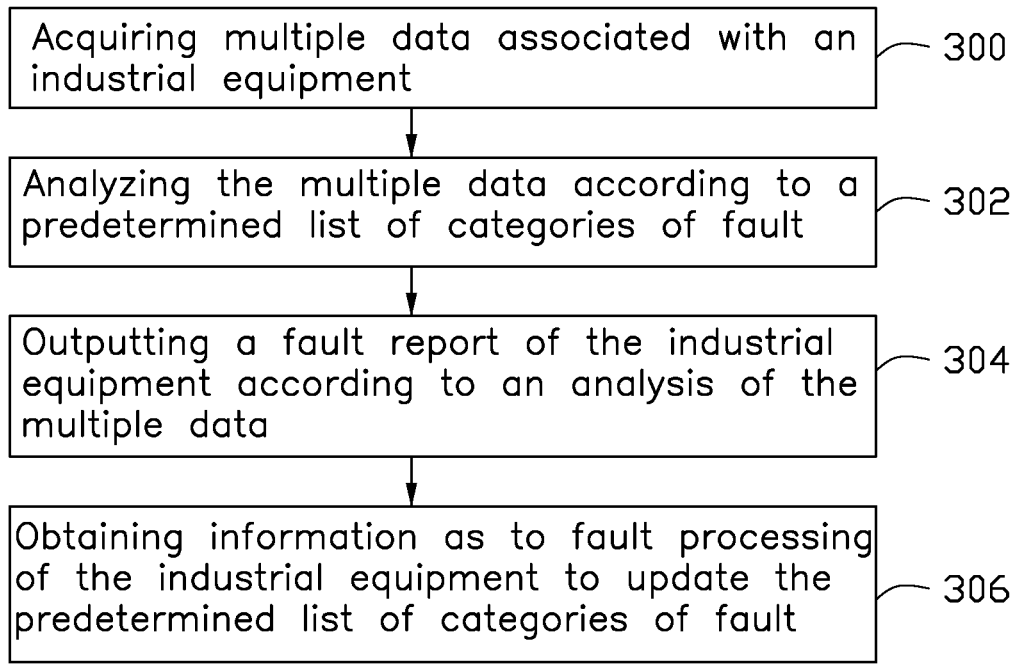
FIG. 3 is a flow diagram of an exemplary embodiment of a method for equipment maintenance.

FIG. 3 illustrates one exemplary embodiment of an equipment maintenance method. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each step shown in FIG. 3 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at block 300.

In block 300, the acquiring module 101 acquires multiple data associated with the industrial equipment 200.

In block 302, the analyzing module 102 analyzes the multiple data associated with the industrial equipment 200 according to a predetermined list of categories of fault.

In block 304, the output module 103 outputs a fault report of the industrial equipment 200 according to an analysis of the multiple data.

In block 306, the update module 104 obtains information as to fault processing of the industrial equipment 200 to update the predetermined list of categories of fault.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An equipment maintenance method comprising:
   acquiring multiple data associated with an industrial equipment by an equipment maintenance device;
   analyzing the multiple data according to a predetermined list of categories of fault by the equipment maintenance device;
   outputting a fault report of the industrial equipment according to an analysis of the multiple data by the equipment maintenance device; and
   obtaining information as to fault processing of the industrial equipment to update the predetermined list of categories of fault by the equipment maintenance device;
   wherein a way of the fault processing is adopted according to the fault report of the industrial equipment;
   wherein the fault report comprises fault level, fault severity information, fault type, probability of fault, fault occurrence time information, parts information related to faults of the fault report, fault maintenance method or maintenance suggestion, and tools required for repairing the faults of the fault report; and
   wherein the fault level is calculated according to the formula: $F=X*Y*Z$, F represents fault level of a fault, X represents an impact rate of the fault to a production project, Y represents an impact rate of the fault to a product quality, and Z represents probability of the fault.

2. The equipment maintenance method of claim 1, wherein the multiple data associated with the industrial equipment comprises equipment recording data, equipment parts recording data, equipment maintenance recording data, equipment operation, data from sensors, data from cameras, and product testing data.

3. The equipment maintenance method of claim 1, wherein the step of analyzing the multiple data according to the predetermined list of categories of fault comprises:
   extracting specific data that conforms to a predetermined rule from the multiple data;
   determining parts of the industrial equipment corresponding to the specific data; and
   analyzing the specific data according to characteristics of the parts of the industrial equipment.

4. The equipment maintenance method of claim 1, wherein the probability of the fault of the industrial equipment can be calculated by:
   establishing a mapping table of the probability of fault and the fault occurrence time information, wherein each fault occurrence time corresponds to a probability of fault in the mapping table;
   obtaining current parameters as to equipment parts and calculating a fault occurrence time of the equipment parts according to the current parameters; and
   looking up the mapping table to obtain the probability of the fault of the equipment parts based on the fault occurrence time.

5. The equipment maintenance method of claim 4, wherein the current parameters of the equipment parts comprises information as to a usage time of the equipment parts, a life expectancy of the equipment parts, a rate of aging of the equipment parts, wear information and impact information of the equipment parts in an operating state, changes in appearance of the equipment parts, and control fault information of the equipment parts.

6. The equipment maintenance method of claim 1, wherein the step of analyzing the multiple data according to the predetermined list of categories of fault comprises:
   extracting predetermined data from the multiple data that is associated with the predetermined list of categories of fault; and monitoring and analyzing the predetermined data to obtain the analysis of the multiple data.

7. An equipment maintenance device comprising:
at least one processor;
a storage; and
one or more programs that are stored in the storage and executed by the at least one processor, the one or more programs comprising instructions for:
acquiring multiple data associated with an industrial equipment;
analyzing the multiple data according to a predetermined list of categories of fault;
outputting a fault report of the industrial equipment according to an analysis of the multiple data; and
obtaining information as to fault processing of the industrial equipment to update the predetermined list of categories of fault;
wherein a way of the fault processing is adopted according to the fault report of the industrial equipment;
wherein the fault report comprises fault level, fault severity information, fault type, probability of fault, fault occurrence time information, parts information related to faults of the fault report, fault maintenance method or maintenance suggestion, and tools required for repairing the faults of the fault report; and
wherein the fault level is calculated according to the formula: F=X*Y*Z, F represents fault level of a fault, X represents an impact rate of the fault to a production project, Y represents an impact rate of the fault to a product quality, and Z represents probability of the fault.

8. The equipment maintenance device of claim 7, wherein the multiple data associated with the industrial equipment comprises equipment recording data, equipment parts recording data, equipment maintenance recording data, equipment operation, data from sensors, data from cameras, and product testing data.

9. The equipment maintenance device of claim 7, wherein the instruction of analyzing the multiple data according to the predetermined list of categories of fault comprises:
extracting specific data that conforms to a predetermined rule from the multiple data;
determining parts of the industrial equipment corresponding to the specific data; and
analyzing the specific data according to characteristics of the parts of the industrial equipment.

10. The equipment maintenance device of claim 7, wherein the probability of the fault of the industrial equipment is calculated by:
establishing a mapping table of the probability of fault and the fault occurrence time information, wherein each fault occurrence time corresponds to a probability of fault in the mapping table;
obtaining current parameters as to equipment parts and calculating a fault occurrence time of the equipment parts according to the current parameters; and
looking up the mapping table to obtain the probability of the fault of the equipment parts based on the fault occurrence time.

11. The equipment maintenance device of claim 10, wherein the current parameters of the equipment parts comprises information as to a usage time of the equipment parts, a life expectancy of the equipment parts, a rate of aging of the equipment parts, wear information and impact information of the equipment parts in an operating state, changes in appearance of the equipment parts, and control fault information of the equipment parts.

12. The equipment maintenance device of claim 7, wherein the instruction of analyzing the multiple data according to the predetermined list of categories of fault comprises:
extracting predetermined data from the multiple data that is associated with the predetermined list of categories of fault; and
monitoring and analyzing the predetermined data to obtain the analysis of the multiple data.

13. A non-transitory computer-readable recording medium storing a program that causes at least one processor to execute a process, the process comprising:
acquiring multiple data associated with an industrial equipment;
analyzing the multiple data according to a predetermined list of categories of fault;
outputting a fault report of the industrial equipment according to an analysis of the multiple data; and
obtaining information as to fault processing of the industrial equipment to update the predetermined list of categories of fault;
wherein a way of the fault processing is adopted according to the fault report of the industrial equipment;
wherein the fault report comprises fault level, fault severity information, fault type, probability of fault, fault occurrence time information, parts information related to faults of the fault report, fault maintenance method or maintenance suggestion, and tools required for repairing the faults of the fault report; and
wherein the fault level is calculated according to the formula: F=X*Y*Z, F represents fault level of a fault, X represents an impact rate of the fault to a production project, Y represents an impact rate of the fault to a product quality, and Z represents probability of the fault.

* * * * *